Figure 1:
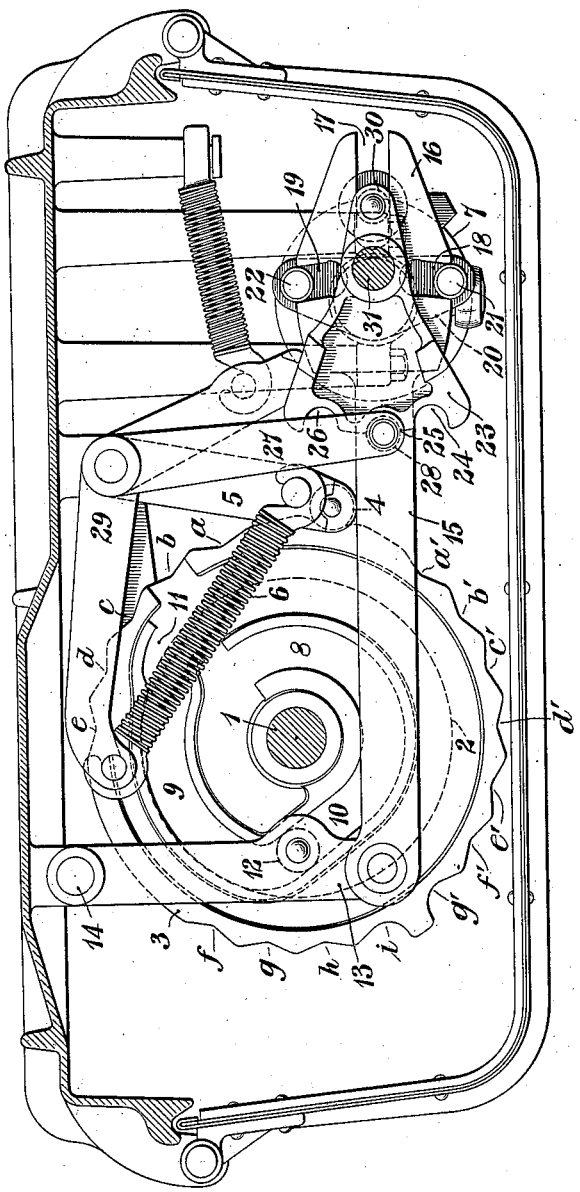

No. 844,352. PATENTED FEB. 19, 1907.
H. U. HART.
CONTROLLER FOR ELECTRIC MOTORS.
APPLICATION FILED JUNE 12, 1905.

2 SHEETS—SHEET 1.

WITNESSES:
C. L. Belcher
Otto S. Schainer

INVENTOR
Harry U. Hart
BY
Wesley G. Carr
ATTORNEY

No. 844,352. PATENTED FEB. 19, 1907.
H. U. HART.
CONTROLLER FOR ELECTRIC MOTORS.
APPLICATION FILED JUNE 12, 1905.
2 SHEETS—SHEET 2.
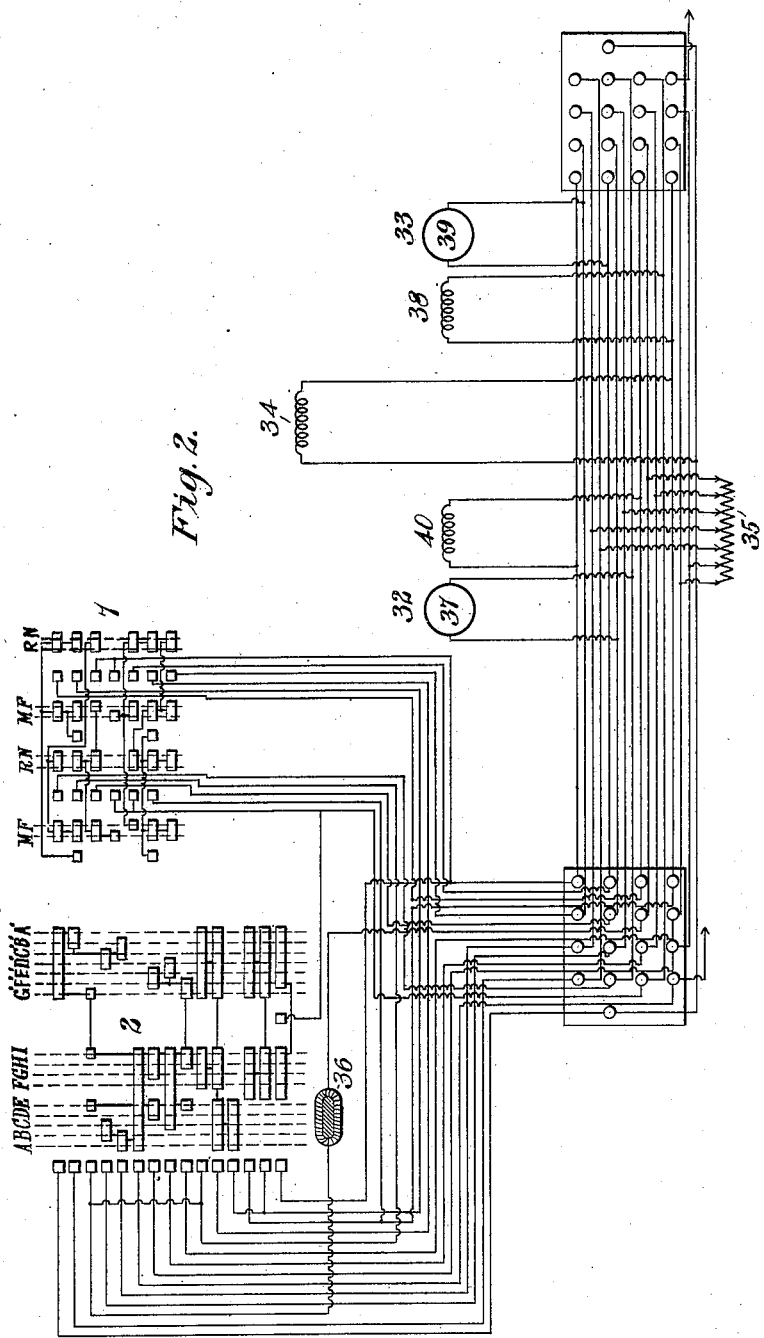
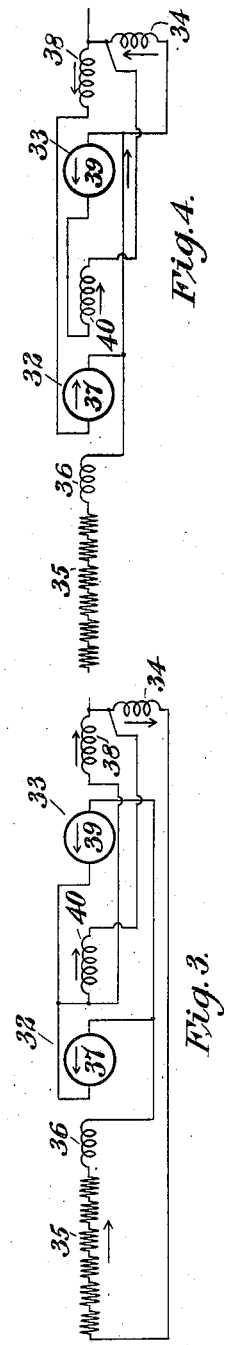
WITNESSES:
Fred. H. Miller
Otto S. Schairer
INVENTOR
Harry U. Hart
BY
Wesley G. Carr
ATTORNEY

UNITED STATES PATENT OFFICE.

HARRY U. HART, OF LE HAVRE, FRANCE, ASSIGNOR TO WESTINGHOUSE ELECTRIC & MANUFACTURING COMPANY, A CORPORATION OF PENNSYLVANIA.

CONTROLLER FOR ELECTRIC MOTORS.

No. 844,352.　　　Specification of Letters Patent.　　　Patented Feb. 19, 1907.

Application filed June 12, 1905. Serial No. 264,836.

*To all whom it may concern:*

Be it known that I, HARRY U. HART, a citizen of the United States, and a resident of Le Havre, France, have invented a new and useful Improvement in Controllers for Electric Motors, of which the following is a specification.

My invention relates to controllers for motor-driven vehicles, and especially to those controllers which are adapted to connect the motors in a local circuit, thereby converting them into generators for braking purposes.

The object of my invention is to provide a controller in which one or more of the braking-notches will be serviceable when the reverse-switch occupies either the forward or reverse position, regardless of the direction of motion of the vehicle.

In the use of the controllers of the prior art that are provided with braking connections it is necessary to change the position of the reversing-switch if for any reason the direction of rotation of the motor armatures becomes the reverse of that to which the original position of the controller corresponds. For instance, if a vehicle is stopped by means of an electric brake during the ascent of a grade and then, owing to the failure of the motorman to operate the hand-brake, starts backward down the grade, it has heretofore been necessary to return the main drum to its off position, change the position of the reversing-switch, and again move the main drum through its braking positions in order that the armature and field-magnet windings of the motors may be connected in proper relation to cause the motors to operate as generators. The motors will not operate as generators if the armature and field-magnet windings remain connected in the same relations that obtained previous to the reversal of the direction of rotation of the armatures, owing to their inherent inability to overcome the residual magnetism of the field-magnet cores, and thereby effect reversal of magnet polarity.

My invention provides means for so interconnecting the armature and field-magnet windings of the motors in a local braking-circuit that the direction of current-flow in at least one field-magnet winding may remain unchanged when the direction of rotation of the armatures is reversed. It is dependent in its operation upon the difference that exists naturally or that may be caused to exist between the voltages generated by the motors when operating as generators. Necessity is thereby avoided for reversing the magnetic polarity of the fields of all of the motors and for operating the reversing-switch in order to obtain braking conditions when the direction of rotation of the motor-armatures changes.

My invention is illustrated in the accompanying drawings, in which—

Figure 1 is a top plan view of a controller constructed in accordance therewith, the inclosing casing being shown in section. Fig. 2 is a diagrammatic view of a development of the controller of Fig. 1 and its circuit connections, and Figs. 3 and 4 represent diagrammatically the circuit conditions when the controller occupies certain of its braking positions.

The controller to which my invention may be and has been applied is one that in its details of construction and mode of operation is very similar to that which is fully shown and described in United States Patent No. 780,058, granted January 17, 1905, to the Westinghouse Electric & Manufacturing Company as assignee of Thomas S. Perkins, and since reference may be had thereto only such parts will be here shown and described as may be essential to an understanding of the operation of my invention.

The shaft 1, on which the main drum 2 is mounted, is provided with an indicator wheel or disk 3, having in its periphery the usual notches $a$, $b$, $c$, $d$, $e$, $f$, $g$, $h$, and $i$, that correspond, respectively, to the power positions of the controller-drum, and notches $a'$, $b'$, $c'$, $d'$, $e'$, $f'$, and $g'$, that correspond, respectively, to the braking positions of the controller. A roller 4, that is mounted in the end of a pawl 5, is drawn into engagement with the periphery of the indicator-wheel by means of a coil-spring 6, as is usual in apparatus of this character.

For the purpose of automatically throwing the reversing-switch 7 when the controller passes from the first power position A to the first braking position A', I provide the wheel 3 with a cam-groove, comprising two concentric portions 8 and 9 at different distances from the shaft 1, and an approximately straight portion 10, connecting the concentric portions 8 and 9, and in order to automatically throw the reversing-switch from positions F and R to positions M and N, respectively, when the main drum is moved from position F' to position G', the wheel 3 is further provided with a grooved portion 11, that adjoins the grooved portion 9 and is more remote from the shaft than said grooved portion 9. Operating in this cam-groove 8 9 10 11 is a roller 12, which is mounted upon an arm 13, the inner end of which is pivoted to the controller frame at 14. One end of an arm 15 is pivotally attached to the outer end of arm 13 and projects approximately at right angles thereto and terminates at its free end in a head 16, having an end slot 17 and two transverse slots 18 and 19.

The reversing-switch head 20 is provided with two laterally-projecting studs 21 and 22, which are respectively in position to coöperate with the lateral slots 18 and 19 in the head 16 of the lever-arm 15. In order to throw the head 16 to the one side of the other for the purpose of engagement with the one or the other of the studs 21 and 22, I provide a lever 23, one end of which is provided with three notches 24, 25, and 26. The pawl 27 carries at its free end a roller 28, that engages with one of the notches 24, 25, and 26 and is pressed into engagement therewith by the spring 6, one end of which is fastened to an extension 29 of the pawl-lever 27, thereby tending to hold the lever 23 in whichever position it may be adjusted. The lever 23 is provided at the end opposite the notches with a stud 30, which is located in the slot 17 in the end of the head 16, and the lever 23 is operated by means of a suitable handle (not shown) attached to the shaft 31, on which the lever 23 is mounted.

When the roller 28 of the pawl 27 is in the central notch 25 of the lever 23, the main controller-drum is locked against movement by means of the slots 18 and 19 and the studs 21 and 22, and this position of the parts corresponds to zero or "off" position of the controller-drum.

In order to throw the reversing-switch in either direction to insure either forward or backward movement of the vehicle, the lever 23 is correspondingly moved by the reversing-switch handle, and it in turn throws the head 16 either inward or outward, so that one of the studs 21 and 22 is in the corresponding lateral slot in the head 16 and the other is free therefrom. The rotation of the main controller-drum then serves, through the cam-groove 8 9 10 11 and coöperating mechanism, to throw the reversing-switch in the direction desired. As soon as the reversing-switch is thrown by this means so that the stud 20 or the stud 21, which is free from the corresponding slot in the head 16 is moved out of alinement therewith the reversing-switch is obviously locked against any other movement so long as the stud or roller 12 is in engagement with either of the concentric portions of the cam-groove 8 9 10 11. If the main drum 2 occupies any of the braking positions from A' to F', inclusive, and the motors governed by the controller come to a stop and then reverse their direction of rotation, the controller-drum should be moved to position G' in order to so connect the field-magnet and armature-windings as to convert the motors into generators.

When the controller occupies any of the braking positions except position G', the roller 12 is located in the concentric portion 9 of the cam-groove; but when the main drum is thrown to the position G' the roller 12 is caused to occupy the portion 11 of the cam-groove which is farthest removed from the shaft 1. This operation causes the reversing-switch to be moved from position R or position F (see Fig. 2) to the one or the other of positions M and N, according to the original position occupied by the reversing-switch.

In the first braking position A' of the controller-drum 2 the reversing-switch may occupy either position F or position R, the conditions of the circuits being as represented in Fig. 3, in which the motors 32 and 33 are connected in parallel relation with each other and in series with a brake-magnet coil 34 and a resistance 35, that is cut out of circuit progressively in the succeeding positions. An equalizing connection is also made between the terminals of the armature-windings that are connected to the terminals of their respective field-magnet windings, and a blow-out coil 36 may be also included in the circuit. The direction of the current-flow is from the armature 37 through field-magnet winding 40, brake-magnet winding 34, and resistance 35, and also from armature 39 through field-magnet winding 38, brake-magnet winding 34, and resistance 35 in the direction of the arrows.

When the main drum is moved to the position G', the reversing-switch is moved to either position M or position N, and the conditions of the circuits may be as illustrated in Fig. 4. The direction of the current-flow may be assumed to be from armature 37, through armature 39 and field-magnet windings 40 and 38, and also through brake-magnet winding 34 in parallel to the circuit through the armature 39 and field-magnet winding 40, all as indicated by the arrows. Since the direction of the current in the field-magnet winding 40 remains the same as before the reversal of direction of rotation of the armatures, the motor 32 will be converted into a generator and the current generated will overcome the residual magnetism in the field-magnet of the motor 33 and it, too, will be converted into a generator for braking purposes. Either motor may first act as a generator and cause reversal of field polarity in the other motor, according to which generates the highest voltage when operating as a generator.

The effectiveness of the winding 34 as a brake-setting means when the circuits are as shown in Fig. 4 depends mainly upon its resistance; but the desired braking effect is not necessarily dependent upon the brake-magnet, since the motors are connected in series in a local circuit and may therefore be relied upon when operating as generators to properly brake the vehicle upon which they are mounted, even though the brake-magnet is inactive.

The controller as here illustrated and described is intended for employment in connection with equipments having brake-setting magnets, though evidently it may be employed with brakes of the rheostatic type, in which the motors are simply converted into generators and the amount of resistance in the circuit varied.

I claim as my invention—

1. The combination with an electrical supply-circuit, two or more electric motors the armature and field-magnet windings of each of which are normally series-connected, and an electrically-operated braking device, of means for connecting the motors with and disconnecting them from the supply-circuit and for connecting them in a closed circuit having an equalizing connection for normal braking, and means for connecting the armature-windings of the motors respectively in series with the field-magnet windings of adjacent motors, without an equalizing connection for reverse braking.

2. The combination with an electrical supply-circuit, two or more electric motors the armature and field-magnet windings of each of which are normally series-connected, and an electrically-operated braking device, of means for connecting the motors with and disconnecting them from the supply-circuit and for connecting them in a closed circuit, and means for interconnecting the armature and field-magnet windings of the motors so that the direction of current-flow in at least one field-magnet winding remains unchanged if the direction of rotation of the armatures is reversed.

3. The combination with an electrical supply-circuit and two or more electric motors the armature and field-magnet windings of each of which are normally series-connected, of means for connecting the motors with and disconnecting them from the supply-circuit and for connecting them in parallel in a closed circuit for normal braking, and means for connecting the armature windings of the motors respectively in series with the field-magnet windings of adjacent motors for reverse braking.

4. The combination with an electrical supply-circuit, and two or more electric motors the armature and field-magnet windings of each of which are normally series-connected, of means for connecting the motors with and disconnecting them from the supply-circuit and for connecting them in parallel in a closed circuit for normal braking, and means for interconnecting the armature and field-magnet windings of the motors so that the direction of current-flow in at least one field-magnet winding remains unchanged when the direction of rotation of the armatures is reversed.

5. The combination with an electric supply-circuit and two or more electric motors the armature and field-magnet windings of each of which are normally series-connected, of a controller comprising a main drum and a reversing-drum, means for automatically throwing the reversing-switch as the main drum moves from power position to braking position and vice versa, and means for connecting the motors in parallel in a closed circuit for normal braking and means for connecting the armature-windings respectively in series with field-magnet windings of adjacent motors for reverse braking.

6. The combination with an electrical supply-circuit and two or more electric motors the armature and field-magnet windings of each of which are normally series-connected, of a controller comprising a main drum and a reversing-drum, means for automatically throwing the reversing-switch as the main drum moves from power position to braking position and vice versa, and means for interconnecting the armature and field-magnet windings of the motors in one of the braking positions so that the direction of current-flow in at least one field-magnet winding remains unchanged when the direction of rotation of the armatures is reversed.

7. The combination with an electrical supply-circuit, and two or more electric motors at least one of which has a higher electromotive force than the other or others when driven as a generator, the armature and field-magnet windings of each of said motors being normally series-connected, of a controller comprising a main drum and a reversing-switch, means for automatically throwing the reversing-switch as the main drum moves from the power position to braking position to connect the motors in parallel in a closed circuit for normal braking and means for moving the reversing-switch to another position to connect the armature-windings respectively in series with the field-magnet windings of adjacent motors for reverse braking.

8. The combination with an electrical supply-circuit, two or more electric motors the armature and field-magnet windings of each of which are normally series-connected, and an electrically-operated braking device, of a controller comprising a main drum and a reversing-switch, means for automatically throwing the reversing-switch as the main drum moves from power position to braking position and vice versa, and means for so interconnecting the armature and field-magnet windings of the motors in a closed circuit with the braking device that the direction of current-flow in at least one field-magnet winding remains unchanged when the direction of rotation of the armatures is reversed.

9. The combination with an electric supply-circuit and two or more electric motors the armature and field-magnet windings of each of which are normally series-connected, of a controller comprising a main drum and a reversing-drum, means for automatically throwing the reversing-switch as the main drum moves from power position to braking position and vice versa, and means for automatically effecting further movement of the reversing-switch as the main drum moves from a given position to another.

10. The combination with an electric supply-circuit and two or more electric motors the armature and field-magnet windings of each of which are normally series-connected, of a controller comprising a main drum and a reversing-drum, means for automatically throwing the reversing-switch as the main drum moves from power position to braking position and vice versa, and means for automatically effecting further movement of the reversing-switch as the main drum moves from a given position to another whereby the motors are connected in a closed circuit with their armature-windings respectively in series with field-magnet windings of adjacent motors.

11. The combination with a main drum and a reversing-switch, of means for automatically throwing the reversing-switch as the main drum moves from a given position to another position and vice versa, and means for automatically effecting further movement of the reversing-switch as the main drum moves from another given position to the next and vice versa.

In testimony whereof I have hereunto subscribed my name this 9th day of June, 1905.

HARRY U. HART.

Witnesses:
OTTO S. SCHAIRER,
BIRNEY HINES.